Jan. 8, 1952　　　C. HILT ET AL　　　2,581,858
TRAMMEL ATTACHMENT FOR TAPE MEASURES
Filed June 9, 1947
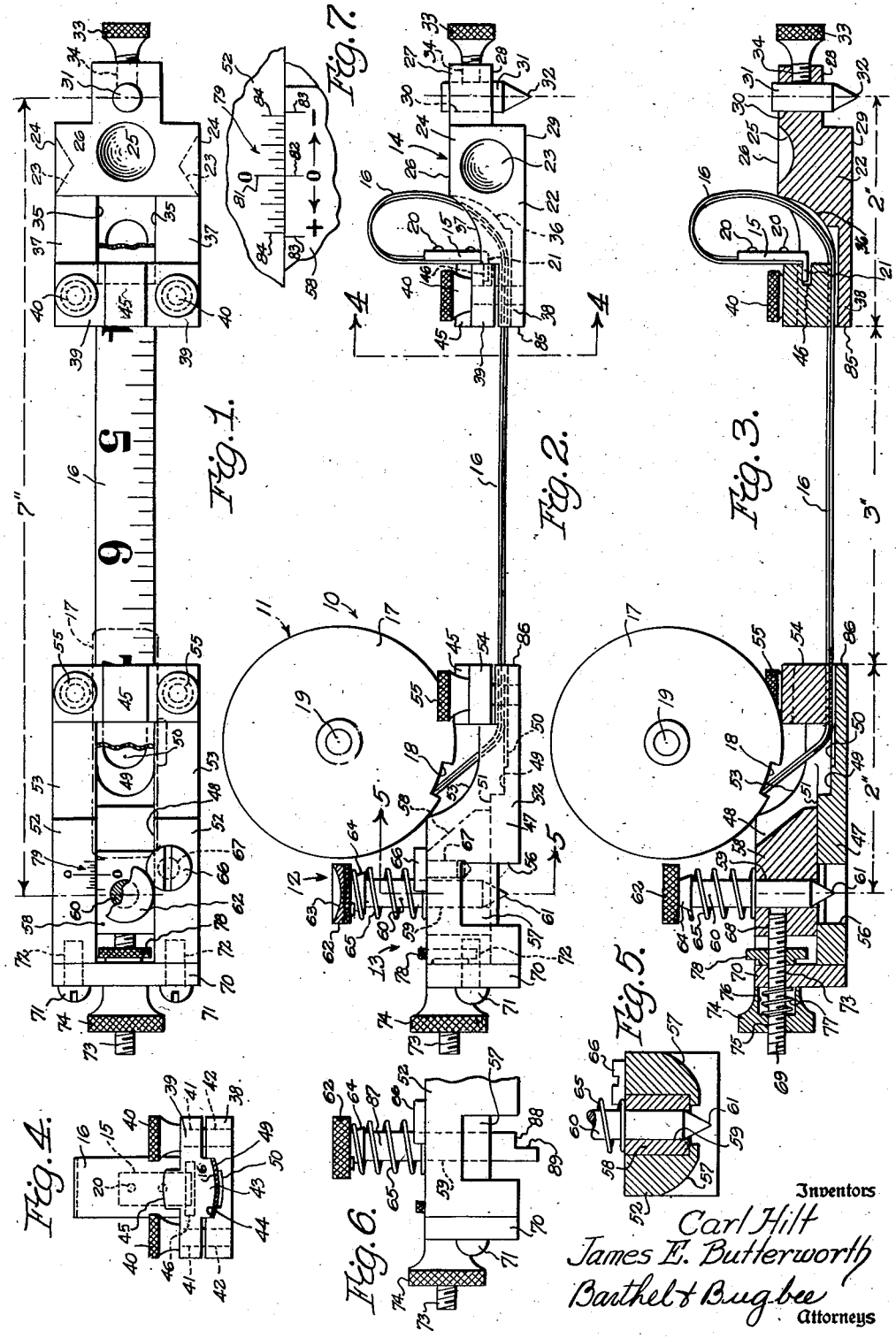
Inventors
Carl Hilt
James E. Butterworth
Barthel & Bugbee
Attorneys Patented Jan. 8, 1952

2,581,858

UNITED STATES PATENT OFFICE 2,581,858

TRAMMEL ATTACHMENT FOR TAPE MEASURES

Carl Hilt, Detroit, and James E. Butterworth, Berkley, Mich.

Application June 9, 1947, Serial No. 753,446

2 Claims. (Cl. 33—27)

1

This invention relates to measuring devices, and in particular to trammels or devices for ruling arcs or circles of very long radii.

One object of this invention is to provide a trammel attachment for a measuring tape, wherein the attachment enables the drawing of circles or arcs of very long radius and using a standard tape measure which may be quickly attached to or detached from the device.

Another object is to provide a trammel attachment for a tape measure wherein a pivot pin and scribing pin construction is employed, which enhances the accuracy of scribing the arc or circle, particularly in view of the associated structure which holds the tape very close to the surface upon which the arc or circle is being scribed or drawn.

Another object is to provide a trammel attachment for a tape measure, wherein the body of the tape measure holder extends on opposite sides of the center or pivot pin, thereby increasing the accuracy of the scribing by causing the tape to be held accurately parallel to the work, and as close as possible to it without the danger of the tape twisting or buckling.

Another object is to provide a trammel attachment for a tape measure of the concave type, particularly the tape measure with a hook at the end thereof, the scribing block having a recess for accommodating a predetermined length of the tape so that the radius of the arc or circle being scribed is easily found from the graduations on the tape.

Another object is to provide a tape trammel consisting of a trammel attachment carrying a standard tape measure, the supporting block and scribing block being movable close together so that the device can be placed in an ordinary mechanic's tool box where it occupies very little room.

Another object is to provide a trammel attachment for a tape measure, as set forth in the preceding objects, wherein a fine adjustment is provided for splitting the finest graduations on the tape so that if the tape is of sufficient accuracy of construction, such as for example a steel tape, the device enables arcs or circles to be drawn to an accuracy greater than that obtainable from the graduations on the tape alone.

Another object is to provide a trammel attachment for a tape measure, the construction of which is so accurate and that may be placed so close to the work that arcs having a radius of many feet can be drawn and the scribing repeated without resulting in the double arc

2 which arises in trammels of less accurate design and construction.

Another object is to provide a trammel attachment for tape measures, wherein a hook pin is optionally provided for the center pin of the device so that the device may be pivoted on the plate or block and an arc accurately drawn with the edge as a point of reference.

Another object is to provide a trammel attachment for a tape measure, wherein means is provided for rendering the point of the center pin or pivot pin easily visible so that it may be accurately positioned in the exact location desired, thereby eliminating the errors which otherwise occur where the center pin cannot be accurately placed on the desired point.

In the drawings:

Figure 1 is a top-plan view of a trammel attachment employing a standard tape measure, according to a preferred form of the invention, with the end portion of the tape broken away to disclose the construction of the scribing block beneath it.

Figure 2 is a side elevation of the trammel attachment shown in Figure 1, with the head of the center pin in longitudinal section.

Figure 3 is a central vertical section through the trammel attachment of Figures 1 and 2.

Figure 4 is a vertical cross-section taken along the line 4—4 in Figure 2, showing the scribing block;

Figure 5 is a fragmentary vertical cross-section through the plane of the pivot or center pin, taken along the line 5—5 in Figure 2;

Figure 6 is a fragmentary side elevation of the left-hand end portion of Figure 2, showing a modified center pin or hook pin used in the invention, and Figure 7 is an enlarged fragmentary top-plan view of a portion of the trammel atttachment at the left-hand end of Figure 1 showing the scale arrangement for splitting the intervals between graduations upon the scale, so as to increase the accuracy of the device.

Referring to the drawings in detail, Figures 1 and 2 show a tape trammel, generally designated 10, consisting of a standard tape measure 11 mounted on and attached to a trammel attachment, generally designated 12, according to the invention. The trammel attachment 12 itself consists of two units, namely a center unit 13, which also holds the tape measure 11, and a scribing unit 14 to which the hook 15 on the free end of the tape 16 of the tape measure 11 is secured. The construction of the trammel attachment 12 is of such that a standard tape measure 11 is employed, preferably of the concave steel tape type (Figure 4). This construction imparts rigidity and accuracy to the device. The details of the tape measure 11 form no part of the present invention and any conventional tape measure may be employed. The tape measure 11 includes a cylindrical or drum-like housing 17 with a slot 18 in the periphery for the passage of the tape 16, the latter being urged inward into the housing 17 by a spring (not shown) which, in turn, is controlled by a push button 19 when it is desired to automatically pull the tape 16 into the casing 17. The hook 15 on the free end of the tape 16 is secured, as by the rivets 20, to the end of the tape (Figure 3) and is provided with a projection 21 which, in the ordinary use of the tape measure 11, is hooked over the edge of the reference point from which the measurement is to be taken.

The scribing unit 14 in which the end hook 15 of the tape 16 is held is in the form of a rectangular block 22, preferably of steel for the sake of precision and resistance to wear, and having concave recesses 23 in its opposite side walls 24 and also a similar recess 25 in the top surface 26 thereof. These recesses are for receiving the fingertips for more conveniently grasping the block 22. A projecting portion 27 of less height than the remainder of the block 22 extends forwardly therefrom, leaving a gap between the bottom wall 28 thereof and the adjacent bottom wall 29 of the block 22. The projecting portion 27 is provided with a vertical bore 30 in which a scribing pin 31 with a conical point 32 is vertically adjustable. The pin 31 is held in its adjusted position by a thumb screw 33 threaded into a transverse threaded hole 34. Thus the space below the bottom surface 28 of the projecting portion 27 enables the point 32 of the scribing pin 31 to be clearly seen. It will be understood, of course, that for work of moderate precision, a pencil or pen may be mounted in the bore 30 in place of the scribing pin 31.

The block 22 is provided with a groove-like recess 35 of the width of the tape 16 and having an upwardly-sloping rear wall 36. The side walls 37 of the recess 35 are parallel and are provided with relatively low front portions 38 upon which a bridge member 39 is secured (Figures 1, 2 and 4) as by the thumb screws 40 threaded through the spaced holes 41 (Figure 4) into the threaded holes 42 in the block 22. The bridge member 39 is provided with a downwardly projecting portion 43 having an arcuate lower wall 44 extending into the recess 35, which is also of arcuate cross-section corresponding to the cross-sectional curvature of the measuring tape 16. The center of the bridge member 39 is provided with an upwardly-extending portion 45 which, when the bridge member 39 is used upon the center unit 13, serves to support the tape measure casing 17 (Figure 3). The bridge member 39 on its rear wall is provided with a cavity 46 of elongated cross-section for receiving the projecting portion 21 on the hook 15 at the end of the measuring tape 16.

The center unit or tape-measure holder 13 consists of a base portion 47 having a recess or slot 48 therein corresponding to the width of the tape 16. The recess 48 at its forward end is provided with upper and lower step portions 49 and 50 respectively sunk below the bottom wall 51 of the recess 48, the side walls 52 of the recess 48 being cut away as at 53, so as to slope downward toward the front of the portion 50. The portion 50 is spanned by a bridge member 54 held in place by thumb screws 55 threaded into the side wall portions 53. The bridge member 54 may thus be clamped down upon the tape 16 by tightening the thumb screws 55, or these may be released temporarily to enable the tape to be unwound until a desired radius is obtained. The bridge member 54 is generally similar to the bridge members 39 shown in Figure 4 for the scribing unit 14, and similar parts and similarly designated.

The base 47 is provided with a cross slot 56 having an arcuate surface 57 sloping inward and downward from the side walls 52 (Figure 5). This cross-slot 56 is for the pupose of rendering the point of the center pin more clearly visible, as described below. Slidably mounted in the slot 48 is a slide block 58 having a vertical bore 59 in which a center pin 60 with a sharp conical point 61 is reciprocably mounted. The point 61 is visible from the side of the centering unit 13 (Figure 2) due to the provision of the cross slot 56, as previously stated. The center pin 60 is provided with a knurled head 62 having a concavity 63 therein for the finger tip and also having a conical portion 64 adjacent its junction with the shank of the pin 60, this portion 64 serving to receive and lock in position the upper end of a coil compression spring 65, the lower end of which engages the top of the slide 58 and urges the center pin 60 upward. At the same time, the reaction of the spring 65 also urges the slide 58 and the base portion 47 downwardly into contact with the surface being worked upon, thereby at all times maintaining the center pin 60 in a perpendicular position.

The slide 58 is retained in its position in the slot 48 by the head of the retaining screw 66 which is threaded into a hole 67 in one of the side walls 52 of the slot 48 and overhangs the latter. The slide 58 is provided with a horizontal hole 68 in which is seated the end of a stud 69. The end of the slot 48 is closed by a plate 70 which is secured by the screws 71 to the side walls 52, the screws 71 being threaded into holes 72 therein (Figure 1). The plate 70 is provided with an unthreaded hole 73 through which the stud 69 passes and is freely slidable. A hollow thumb nut 74 with a threaded bore 75 is threaded upon the stud 69 and is provided with a recess 76 containing a coil spring 77. The rotation of the thumb nut 74 thus causes the stud 69 to move inward or outward relatively to the plate 70, transmitting this motion to the slide 58. A knurled locknut 78 serves to lock the stud 59 in a given position. By this means the center pin 60 is moved to and fro relatively to the block 47 in which the slide 58 is reciprocably mounted.

In order to make use of the slide 58 for increasing the accuracy of setting of the device, the top surface of one of the side walls 52 is provided with a linear scale 79 (Figures 1 and 7) which is graduated in any system of linear measurement, such as inches or centimeters, in opposite directions from a zero point 80. The slide 58 is provided with a similar zero point 82 and spaced graduations 83 which are farther from the zero line 82 by one-half of the finest graduation interval than the limit marks 84. As a consequence, when one of the marks 83 is moved into coincidence with one of the marks 84, the radius set between the center pin 60 and the scribing pin 31, it is increased or decreased by an amount equal to one-half these graduations, depending upon whether the slide 58 is moved in the direction of the plus arrow or minus arrow in Figure 7.

The point 32 of the scribing pin 31 (Figure 3) is located at a predetermined distance, for example, two inches from the end surface 85 of the block 22. In a similar manner, the point 61 of the center pin 60 is located at a predetermined distance, for example, two inches from the front wall 86 of the base 47. Thus, the effect of this is to decrease the effective length of the measuring tape 16 by the combined amounts of these distances, for example, four inches. Therefore, if the tape 16 is clamped with its four-inch graduation in alignment with the end wall 85 of the block 22, then the graduation on the tape 16 which is in alignment with the end 86 of the base 47 (Figure 3), will be the radius of the arc which will be drawn when the device is used.

The modification shown in Figure 6 is similar to the principal form of the invention shown in Figure 2, and similar parts are similarly designated. In the modification of Figure 6, however, the centering pin 87 is provided with a "point" which is laterally notched or cut away as at 88 to provide an abutment surface or shoulder 89 which lies precisely upon the central axis of the pin 60 and bore 59. The purpose of this modification is to facilitate the use of the device in striking arcs from the edge of a plate, table or the like, as a center.

In the operation of the invention, the bridge members 39 and 54 are removed by removing the thumb screws 55. A short length of the measuring tape 16 is unrolled and inserted in the grooves or recesses 50 and 35 respectively. The bridge members 39 and 54 are then replaced and clamped in position by the thumb screws 40 and 55 respectively, the hook portion 15 having its projection 21 seated in the recess 46 (Figure 3). The tape 16 is clamped with the graduation corresponding to the sums of the distances between the point 61 and surface 86 and the point 32 and the surface 85 in alignment with the end surface 85 of the block 22. The graduation appearing next to the end surface 86 of the center unit 12 then represents the radius of the arc which will be actually drawn when the device is used. The thumb screws 55 are then tightened to clamp the tape 16 at the selected radius. The casing 17 of the tape measure 11 then rests partly upon the projection 45 on top of the bridge member 54 and partly upon the junction of the cut away portions 53 (Figures 2 and 3) with the side walls 52 of the slot 48.

The operator then brings the block 52 close to the point at which the center of the arc is to be located, if he has not already done so. Assuming that the center is located in the usual manner by a prick punch mark or indentation, the operator pushes the centering pin 60 downward until the point 61 enters the prick punch indentation, sliding the block 52 to and fro with the fingers while aligning the point 61 with the prick punch indentation through the cross-slot 56. With the point 61 of the center pin 60 thus lined up with the center of the proposed arc, the operator stretches the tape 16 outward until it is taut, holding the block 22 between his fingers, and scribes the arc by swinging the block 22 of the scribing unit 14 around the point 61 of the center pin 60 as a center. The concave recesses 23 and 25, by providing places for his fingertips, assist him in this respect.

In the event that the operator desires to use the edge of a plate, table or the like as a center from which to strike the arc, he replaces the pointed center pin 60 of Figure 2 with the stepped center pin 87 (Figure 6), resting the shoulder 89 against the edge of the plate or table. He then repeats the operations described above, holding one finger down upon the top of the pin 87 in order to hold it in engagement with the edge of the table or plate. With the scribing unit 14 held between his fingers as previously described, he scribes the arc.

What we claim is:

1. A trammel attachment for detachable self-contained encased tape measures comprising a scribing unit having a body with a scribing element and a holder for the end portion of a measuring tape, and a center unit having a body with a center element, a support having a portion detachably receiving the tape measure casing, and a clamp engageable with an intermediate portion of the measuring tape adjacent said tape measure casing, said scribing unit including a clamp engageable with said tape at a location spaced away from its forward free end and having a tape deflector disposed forwardly of said clamp and positioned to engage and bend upwardly the forward free end portion of said tape.

2. A trammel attachment for detachable self-contained encased tape measures comprising a scribing unit having a body with a scribing element and a holder for the end portion of a measuring tape, and a center unit having a body with a center element, a support having a portion detachably receiving the tape measure casing, and a clamp engageable with an intermediate portion of the measuring tape adjacent said tape measure casing, said scribing unit including a clamp engageable with said tape at a location spaced away from its forward free end and having a cavity forwardly of said clamp, adapted to receive the end of said tape, said cavity having therein an upwardly-directed tape-deflecting portion disposed forwardly of said clamp and positioned to engage and bend upwardly the forward free end portion of said tape.

CARL HILT.
JAMES E. BUTTERWORTH.

REFERENCES CITED

The following references are of record in the file of this patent:

UNITED STATES PATENTS

| Number | Name | Date |
| --- | --- | --- |
| 366,890 | Seargeant | July 19, 1887 |
| 588,129 | Clough | Aug. 17, 1897 |
| 776,897 | Ferris | Dec. 6, 1904 |
| 812,322 | Badger | Feb. 13, 1906 |
| 1,045,300 | Lary et al. | Nov. 26, 1912 |
| 1,259,886 | McLeod | Mar. 19, 1918 |
| 1,404,794 | Reitenbaugh | Jan. 31, 1922 |
| 2,349,670 | Moxey | May 23, 1944 |
| 2,400,343 | Eskil | May 14, 1946 |
| 2,443,672 | Allen | June 22, 1948 |

FOREIGN PATENTS

| Number | Country | Date |
| --- | --- | --- |
| 64,589 | Norway | Mar. 23, 1942 |
| 500,362 | France | Dec. 15, 1919 |
| 604,777 | Germany | Oct. 27, 1934 |